US012811961B2

(12) United States Patent
Ramesh et al.

(10) Patent No.: US 12,811,961 B2
(45) Date of Patent: Nov. 24, 2026

(54) GRAPH INTELLIGENCE-BASED MALICIOUS CAMPAIGN DETECTION

(71) Applicant: Palo Alto Networks, Inc., Santa Clara, CA (US)

(72) Inventors: Reethika Ramesh, Sunnyvale, CA (US); Daiping Liu, Santa Clara, CA (US); Zhanhao Chen, Santa Clara, CA (US); Wanjin Li, Santa Clara, CA (US); Fan Fei, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 62 days.

(21) Appl. No.: 19/060,884

(22) Filed: Feb. 24, 2025

(65) Prior Publication Data

US 2026/0254818 A1 Aug. 27, 2026

(51) Int. Cl.
*H04L 9/40* (2022.01)
*G06F 16/901* (2019.01)

(52) U.S. Cl.
CPC ...... *H04L 63/1416* (2013.01); *G06F 16/9024* (2019.01)

(58) Field of Classification Search
CPC ......................... H04L 63/1416; G06F 16/9024
USPC ............................................................. 726/1
See application file for complete search history.

(56) References Cited

U.S. PATENT DOCUMENTS

| | | | | |
|---|---|---|---|---|
| 10,237,294 | B1 * | 3/2019 | Zadeh | H04L 63/1425 |
| 11,463,464 | B2 * | 10/2022 | Zadeh | H04L 63/1425 |
| 12,489,771 | B1 * | 12/2025 | Erlingsson | G06F 9/5072 |
| 12,556,559 | B1 * | 2/2026 | Bhattacharya | G06F 16/9024 |
| 12,652,299 | B1 * | 6/2026 | Zadeh | H04L 63/1425 |
| 2016/0366164 | A1 * | 12/2016 | Cohen | H04L 63/1425 |
| 2018/0205552 | A1 * | 7/2018 | Struttmann | H04L 9/3242 |
| 2020/0287927 | A1 * | 9/2020 | Zadeh | H04L 63/1425 |
| 2023/0008173 | A1 * | 1/2023 | Crabtree | G06F 16/951 |
| 2023/0132703 | A1 * | 5/2023 | Marsenic | H04L 63/1433 726/25 |
| 2024/0061937 | A1 * | 2/2024 | Camp | G06F 40/237 |
| 2025/0330484 | A1 * | 10/2025 | Marsenic | H04L 63/1433 |
| 2025/0373660 | A1 * | 12/2025 | Crabtree | G06F 16/951 |

OTHER PUBLICATIONS

Lazar, et al., "IMDoC: Identification of Malicious Domain Campaigns via DNS and Communicating Files", IEEE Access, vol. 9, Mar. 2021, 17 pages, DOI: 10.1109/ACCESS.2021.3066957.

* cited by examiner

*Primary Examiner* — Samson B Lemma
(74) *Attorney, Agent, or Firm* — Gilliam IP PLLC

(57) ABSTRACT

A malicious campaign detection system ("detection system") detects malicious campaigns according to a graph structure of network-related entities and uses the graph structure to generate descriptions of the malicious campaigns and to monitor the malicious campaigns for changes. As the detection system ingests seed entities of interest, the detection system retrieves seed entity graphs and then prunes/merges the graphs. The detection system applies rules to the pruned merged/graphs to determine whether each pruned/merged graph is malicious. Finally, the detection system propagates verdicts in the detect malicious graphs and identifies entities having malicious propagated verdicts as being important/releasable for the corresponding malicious campaign.

20 Claims, 10 Drawing Sheets

1/10

GRAPH INTELLIGENCE-BASED MALICIOUS CAMPAIGN DETECTION

BACKGROUND

The disclosure generally relates to data processing (e.g., CPC subclass G06F) and to computing arrangements based on specific computational models (e.g., CPC subclass G06N).

A cyberthreat campaign, sometimes called a "malicious campaign," is an organized set of activities to achieve a malicious purpose or goal (e.g., data exfiltration, unauthorized device/network access, fraud, etc.). Malicious campaigns often use a variety of attacks to achieve their purpose. Stages correspond to different types of attacks such as phishing attacks, system hijacking, and database injection attacks. The MITRE Corporation publishes the MITRE ATT&CK® knowledge base of tactics and techniques relating to attacks used by malicious campaigns. The MITRE corporation categorizes tactics and techniques by stages of an attack, those stages being: "Reconnaissance", "Resource Development", "Initial Access", "Execution", "Persistence", "Privilege Escalation", "Defense Evasion", "Credential Access", "Discovery", "Lateral Movement", "Collection", "Command and Control", "Exfiltration", and "Impact". Each stage has a plurality of techniques that a malicious actor can use to effectuate an attack. Examples of the published tactics are phishing, resource hijacking and gathering of victim information.

BRIEF DESCRIPTION OF THE DRAWINGS

Embodiments of the disclosure may be better understood by referencing the accompanying drawings.

DESCRIPTION

Figure 1:
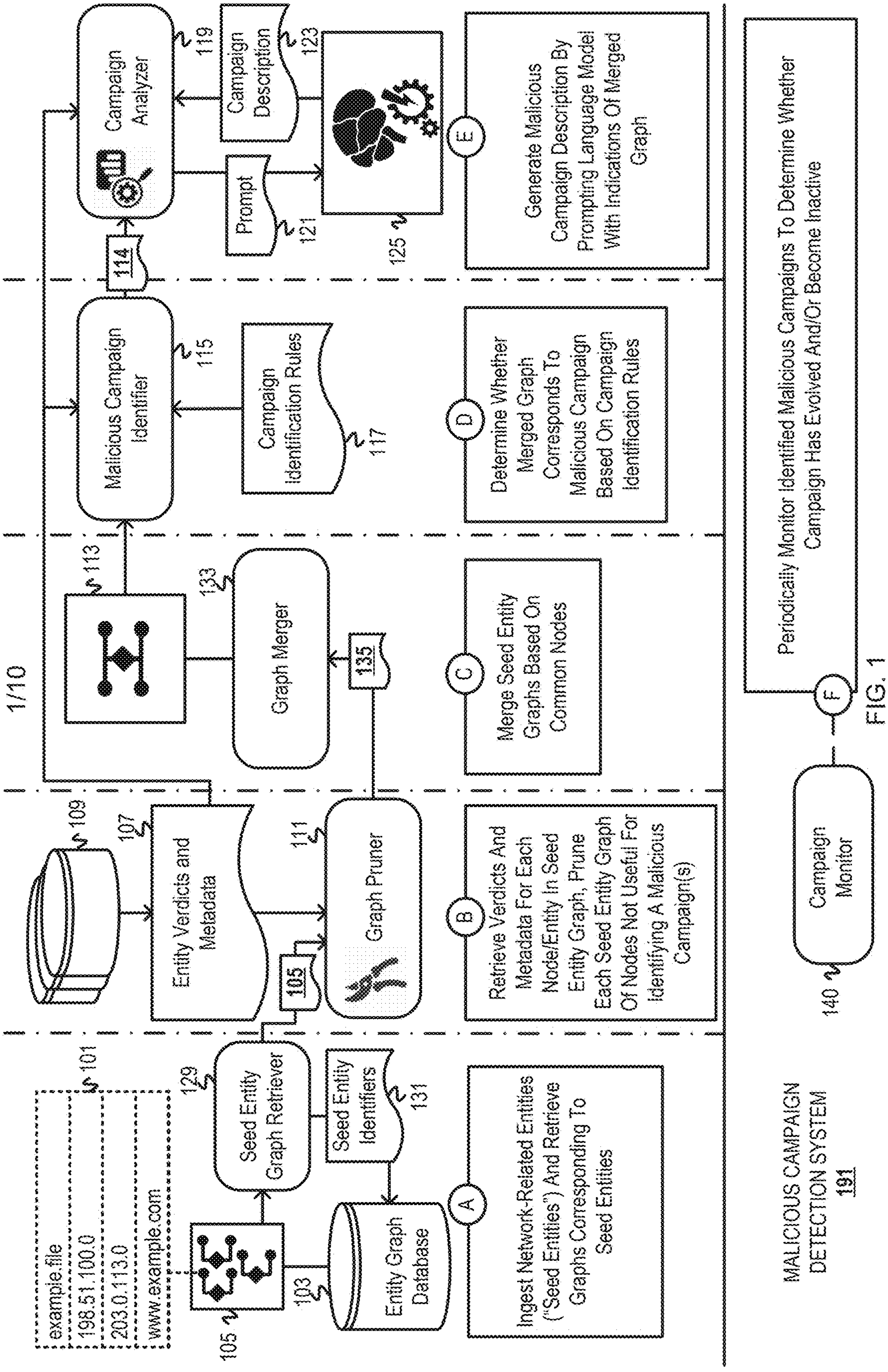
FIG. 1 is a schematic diagram of a malicious campaign detection system for identifying sets of network-related entities corresponding to malicious campaigns.

The description that follows includes example systems, methods, techniques, and program flows to aid in understanding the disclosure and not to limit claim scope. Well-known instruction instances, protocols, structures, and techniques have not been shown in detail for conciseness.

Overview

Security services which detect malicious entities can provide users of the security services with information about individual entities which are potential threats to their businesses or customers. Identifying malicious entities on an individual level, however, can lead to a lack of contextual information that would allow for users to understand malicious campaigns associated with or that utilize those entities.

A malicious campaign detection system ("system") has been developed which addresses the issues caused by conventional detection systems. The malicious campaign detection system uses relational entity data to generate/obtain malicious campaign data that has contextual data about each entity in the campaign and their relationships with other malicious entities. The system ingests entities that comprise domains, Internet Protocol (IP) addresses, Uniform Resource Locators (URLs), and downloaded files. The system selects a set of these entities ("seed entities") which are determined as being potentially associated with a malicious campaign from either a set of entities that correspond to newly registered domains (NRDs), newly observed domains, domains indicated in telemetry logs, or a set of entities manually selected based on user interest in a certain selection of entities. The system retrieves a seed entity graph for each seed entity from a graph database which stores graph data for entities that have been analyzed. Each seed entity graph has data about entities that share a direct relationship (or within a few degrees) with the seed entity. For each node in a seed entity graph, the system obtains verdicts and metadata corresponding to the node which will be used to determine the malicious or benign status of each node. The system prunes nodes from each seed entity graph that are determined as unhelpful for detecting malicious campaigns using the per-entity verdicts and metadata. After pruning, the system merges seed entity graphs based on common nodes, generating a merged graph(s) that depicts the relationships between different seed entities according to their graphs. Each merged graph is evaluated to determine if the merged graph corresponds to a malicious campaign based on a set of campaign identification rules. Using the per-entity verdicts and metadata for each node in the combined graph alongside the merged graph metadata, the system prompts a language model to generate malicious campaign descriptions for each merged graph that is determined to correspond to a malicious campaign. The prompt comprises instructions to generate a malicious campaign description that indicates relationships shared by entities, relationships between malware samples and important entities for the malicious campaign, naming patterns of the malicious campaign that indicate abuse, common relationship types for the malicious campaign, and instructions to analyze how attackers are leveraging malicious network entities in the malicious campaign. The resulting malicious campaign description comprises contextual data about the malicious campaign as a whole that informs how different network entities in the malicious campaign relate to each other. The use of seed entity graphs by the system to identify and describe malicious campaigns is an improvement over existing malicious entity detection systems because the system leverages pairwise entity relationships described by the entity graphs to detect malicious campaigns across entities.

Example Illustrations

FIG. 1 is a schematic diagram of a malicious campaign detection system for identifying sets of network-related entities corresponding to malicious campaigns. A malicious campaign detection system ("system") 191 comprises a seed entity graph retriever 129 that periodically queries an entity graph database 103 with seed entity identifiers 131 to retrieve seed entity graphs 105 corresponding to each seed entity that store relationship data between the seed entities and other network-related entities. A graph pruner 111 retrieves entity verdicts and metadata 107 for each of the seed entity graphs 105 and prunes the seed entity graphs of nodes that are not likely to be useful for malicious campaign identification to generate pruned graphs 135. A graph merger 133 receives and merges the pruned graphs 135 based on common nodes to generate a merged graph(s) 113. A malicious campaign identifier 115 analyzes the merged graph(s) 113 and determines which of the merged graph(s) 113 correspond to a malicious campaign. If the malicious campaign identifier 115 identifies that one or more merged graph in the merged graph(s) 113 as corresponding to a malicious campaign ("campaign graph(s) 114"), the malicious campaign identifier 115 communicates the campaign graph(s) 114 to a campaign analyzer 119. For each campaign graph in the campaign graph(s) 114, the campaign analyzer 119 uses the entity verdicts and metadata 107 to generate a prompt to a language model 125 and invokes the language model on the prompt 121 to generate a malicious campaign description 123. The system 191 further comprises a campaign monitor 140, which periodically re-analyzes malicious campaigns to determine whether the campaigns have changed over time or become inactive (i.e., previous malicious entities may no longer exist or have malicious verdicts).

FIG. 1 is annotated with a series of letters A-F representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the system 191 ingests initial network-related entities ("seed entities") and retrieves seed entity graphs corresponding to the seed entities. As new seed entities are detected by the system 191, the seed entity graph retriever 129 retrieves graph data from the entity graph database 103 for each detected seed entity. Nodes in the entity graph database 103 correspond to network-related entities (e.g., domains, uniform resource locators (URLs), IP addresses, and network files), and edges describe relationships between those network-related entities (e.g., subdomain_of, download, path_of, resolve_a_to, etc.). For example, a domain entity can be a sub-domain of another domain (e.g., blog.example.com is a subdomain of example.com). Likewise, a file can be downloaded from an IP address corresponding to a network device. Edges can be outgoing or incoming relative to the perspective of a network entity. Relationship types can include that a domain name to an IP address of the second entity, that a domain is a subdomain of another domain, that an entity downloads another entity, that an entity redirects to another entity, that an entity contains or indicates another entity, that an entity contacts another entity, that an entity is a path of another entity, that a destination address for an email communicated from an entity resolves to the another entity, and that a domain name of an first entity resolves to a domain name of the another entity The seed entity graph retriever 129 queries the entity graph database 103 with seed entity identifiers 131 and hyperparameters for retrieving the seed entity graphs 105 that indicate a number of entities to include for each of the seed entity graphs 105. Each seed entity graph includes its central node (i.e., the seed entity) and the N (e.g., N=100) most proximal network entities to the seed entity. The system 191 can retrieve these proximal entities by leveraging a retriever service (not depicted) which performs a breadth first search (BFS) on the entity graph database 103. Example seed entities 101 include a file "example.file", two IP addresses "198.51.100.0" and "203.0.113.0" and a domain "www.example.com". The seed entity graphs 105 can be in formats which fall under the resource description framework (RDF). These formats JavaScript® Object Notation (JSON) format, or Terse Resource Description Framework (RDF) Triple Language (Turtle) which fit into the RDF data model can be structured to store relationship data between graph nodes (i.e., entities) and their edges (i.e., entity relationships). For example, if the graph data for a seed entity is stored in JSON format, it could have fields which correspond to the list of edges in the graph, the list of nodes and their types, and verdict data (in implementations where verdict data may be stored in the graph data). The seed entity graph retriever 129 then communicates the seed entity graphs 105 to the graph pruner 111. For the sake of illustration, further figures will depict this graph data as an actual graph.

At stage B, the graph pruner 111 retrieves the entity verdicts and metadata 107 from data sources 109 for entities in the seed entity graphs 105 and uses the entity verdicts and metadata 107 to prune nodes from the seed entity graphs 105 determined to not be useful for malicious campaign identification. Examples of data sources the system can query to obtain verdict-related data on entities are FP check (Fingerprinting service), Indication of Behavior (IOB) and Indication of Compromise (IOC) databases, WHOIS domain databases, Passive Domain Name System (DNS) stores, and VirusTotal® scanner results. If the data sources 109 provide conflicting information about the status of a node (i.e., some sources indicate the node is benign and others indicate that the node is malicious) the graph pruner 111 can be configured to determine a verdict for the node by combining verdicts from the external services or datasets. The graph pruner 111 can apply weights (e.g., a score) to the verdict from each external service or dataset. Using the determined weights, the graph pruner 111 can then determine the verdict for the node using a weighted average of the combined verdicts. If data sources 109 all indicate a unanimous verdict for a node, the verdict will be the unanimous verdict. In some cases, some graph nodes in the seed entity graph may have unknown verdicts (e.g., when no known verdicts are returned by the external services or datasets).

Figure 2:
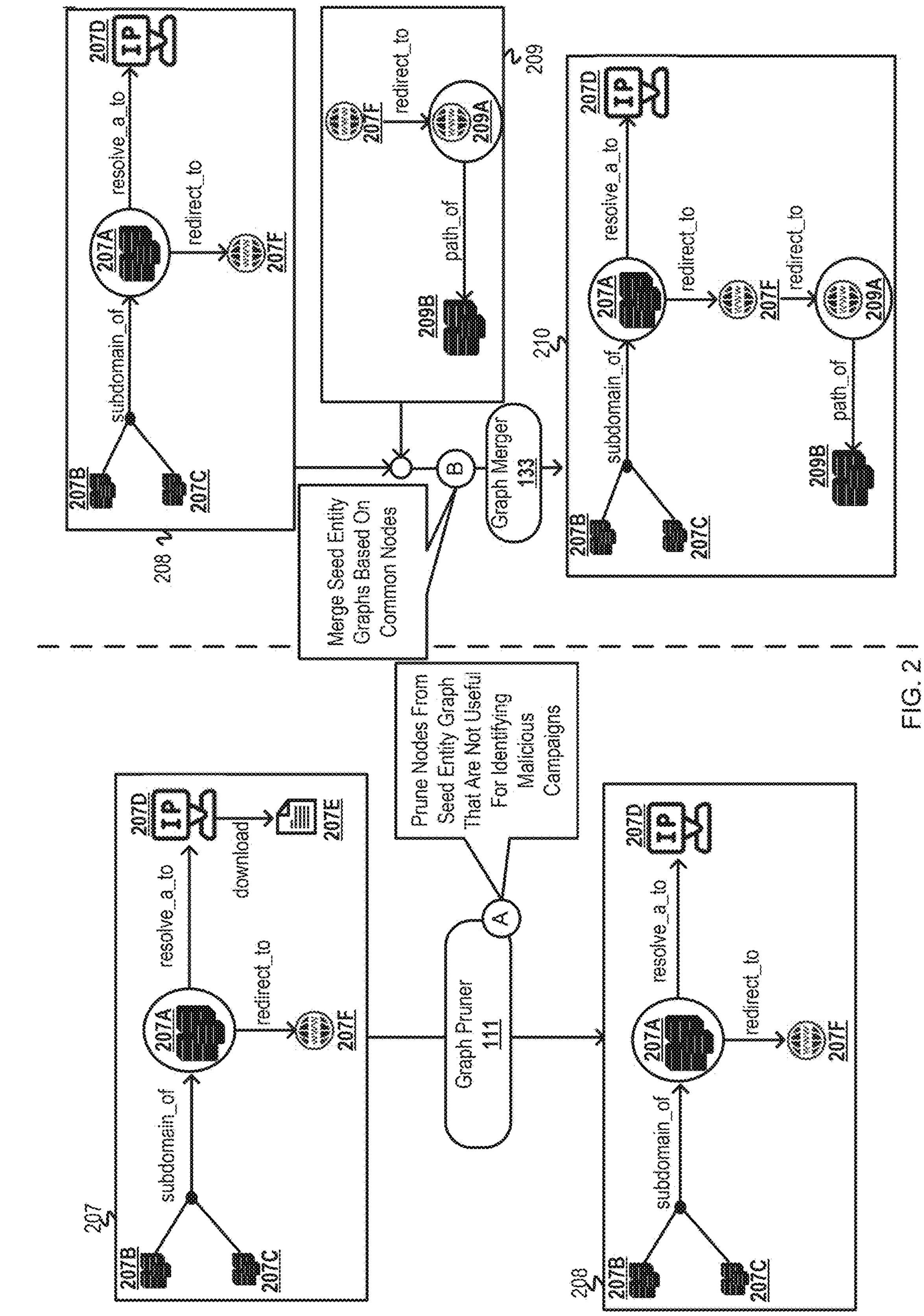
FIG. 2 is an illustrative diagram of pruning an example seed entity graph and merging the pruned seed entity graph with another seed entity graph based on their common nodes.

At stage C, the graph merger 133 merges the pruned graphs 135 based on common nodes to generate the merged graph(s) 113. The graph merger 133 identifies common node labels across pruned graphs in the pruned graphs 135 and merges pruned graphs having common node labels. FIG. 2 further depicts and describes this stage of operation. In some cases, a seed entity may not be merged because it shares no common nodes with other seed entity graphs. In this case, the system 191 can treat the seed entity graph as a merged graph in subsequent stages of operation.

At stage D, the malicious campaign identifier 115 determines if the merged graph(s) 113 corresponds to malicious campaign(s). To make the determination, the malicious campaign identifier 115 references the set of campaign identification rules 117. The campaign identification rules 117 specify a set of merged graph metadata thresholds which, if met, indicate that a merged graph is associated with a malicious campaign. An example of merged graph metadata is the number of malicious nodes in the graph. A threshold can therefore specify that the number of malicious nodes in a merged graph must exceed a certain percentage of total nodes in the merged graph. Additional thresholds can include a threshold length for the longest path in a merged graph, a threshold popularity for the popularity of malicious entities in the merged graph, and a threshold lexical similarity in the naming of malicious entities in the merged graph. Lexical similarity can be represented by a normalized value (e.g., 0-1) based on the median lexical similarity value of pairwise lexical similarities for pairs of seed nodes (i.e., nodes corresponding to domains which were seed nodes of a seed entity graph prior to merging taking place) within a merged graph. If one or more of these thresholds are met, the malicious campaign identifier 115 identifies the merged graph as corresponding to a malicious campaign ("campaign graph"). Not all entities in the campaign graph may be included in the malicious campaign. These entities are left in the campaign graph to provide additional context for the campaign (e.g. a name server the campaign uses but is not itself malicious). The malicious campaign identifier 115 communicates the campaign graph(s) 114 which represents the subset of the merged graph(s) 113 identified as corresponding to a malicious campaign to the campaign analyzer 119.

Figure 5:
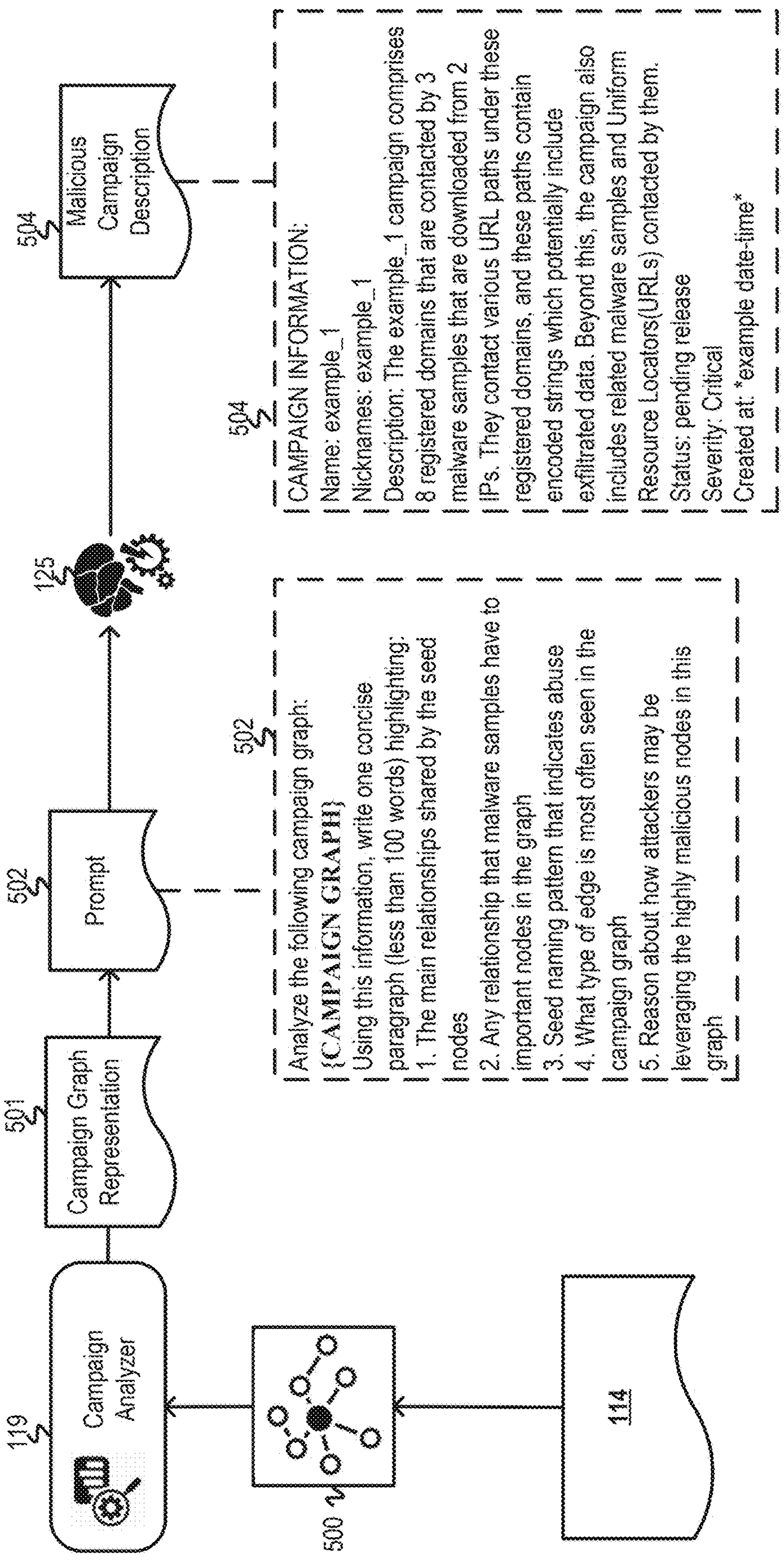
FIG. 5 is an illustrative diagram of a campaign analyzer prompting a language model to generate a malicious campaign description based on campaign graph metadata.

At stage E, the campaign analyzer 119 generates the malicious campaign description 123 by prompting the language model 125 with indications of the campaign graphs(s) 114. The campaign analyzer 119 builds a prompt 121 that comprises the per-entity metadata, merged graph metadata, and instructions to generate a useful campaign description. The malicious campaign description 123 includes useful campaign information that informs a user of how the campaign is structured. Examples of useful campaign information includes information about important nodes in the campaign (i.e., nodes that are important to the campaign attack strategy) and common relationship types between malicious entities (e.g., "12 malicious domains are subdomains_of a common malicious domain 'X'"). A campaign description can also include analysis performed by the language model that explains trends in how malicious actors are using the malicious network entities in the campaign. In addition to generating the malicious campaign description, the system 191 determines which entities in the campaign are releasable. The system 191 propagates verdicts between nodes in the campaign graph 114 to identify nodes that have a net-malicious verdict, and nodes that have net-malicious verdicts are identified as releasable. The system 191 releases the malicious campaign description 123 as well as the data on the identified releasable entities to users of the system 191. An example prompt to the language model 125 is depicted in FIG. 5.

At stage F, the campaign monitor 140 periodically monitors malicious campaigns to determine whether the campaigns have evolved or become inactive. An evolved campaign is one in which the malicious campaign may have changed its attack approach or stage and may be utilizing different entities from the last time the malicious campaign was detected/updated. Alternatively, entities of a campaign or a campaign itself may also become inactive if the network entities previously identified as part of a campaign become inactive. The campaign monitor 140 retrieves updated metadata for each entity in a malicious campaign and determines if the metadata indicates the entities are inactive. Inactive entities are disabled (i.e., they are not included in the campaign's description), but their data is preserved for future scans of the campaign. The campaign monitor 140 may disable a campaign if the campaign no longer has a sufficient number of malicious entities to justify it as an active campaign. The campaign monitor 140 can scan data sources of new network entities (e.g. NRD databases) to identify new network entities that should be included in the campaign. The campaign monitor 140 can determine that a new network entity should be included in the campaign by checking whether the new network entity is connected to malicious entities already determined as part of the malicious campaign (e.g., a new file is downloaded from a malicious IP address already a part of the campaign). Any new network entities included in the campaign are released alongside the existing campaign description to expand the coverage of the campaign.

FIG. 2 is an illustrative diagram of pruning an example seed entity graph and merging the pruned seed entity graph with another seed entity graph based on their common nodes. FIG. 2 depicts the graph pruner 111 and the graph merger 133 described above in reference to FIG. 1. FIG. 2 is divided down the middle by a dashed line. The left side of the dashed line FIG. 2 depicts a seed entity graph 207 being pruned by the graph pruner 111 to generate a pruned seed entity graph 208. On the right side of the graph, FIG. 2 depicts the pruned seed entity graph 208 being merged with another seed entity graph 209 by the graph merger 133. FIG. 2 and future figures may refer to the entities in a seed entity graph as a node when talking about graph operations. Any operation affecting a node is the same as an operation affecting an entity (e.g., pruning a node from a graph is the same as pruning an entity from a graph).

FIG. 2 depicts the seed entity graph 207 which corresponds to the seed entity 207A which is a domain. The seed entity graph 207 depicts the seed entity 207A connected to various nodes, including two additional domains 207B and 207C, a URL 207F, an internet protocol (IP) address 207D, and a file 207E. The file 207E is an example of an entity which is not directly connected to the seed entity 207A (i.e., the distance in the graph between the entity and seed entity is greater than 1). Although not directly connected to the seed entity 207A, the file 207E shares a relationship with the domain indirectly through the IP address 207D. Network entities generally are either directly connected to the seed entity or connected through a path of connected network entities as is the case of the file 207E. In some cases, entities that are not directly connected to a seed entity may be removed from a seed entity graph if the number of edges between the entity and the seed entity (i.e., the distance between the entities) exceeds a value configured by the malicious campaign detection system.

FIG. 2 is annotated with the letters A and B representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the graph pruner 111 prunes nodes from the seed entity graph 207 which are not useful for identifying malicious campaigns. FIG. 2 depicts the pruned seed entity graph 208 after the file 207E is pruned from the seed entity graph 207. This indicates that the file 207E was determined to be either a noisy benign node (i.e., a benign entity that is for the most part connected to other benign entities, and would not provide any context to an identified campaign such as a popular DNS nameserver that serves tens of thousands of domains) or a benign leaf node (i.e., the node only has incoming edges, is benign, and has no outgoing edges). Noisy benign nodes have many outgoing edges, resulting in a need to prune these nodes. In this example, the file 207E is a benign leaf node because its only relationship to the seed entity graph 207 is its relationship to the IP address 207D. The IP address 207D in this example is presumed to be benign, and therefore the file 207E, which shares a download relationship with the IP address 207D, does not provide any useful contextual information about a potential malicious campaign. The file 207E is therefore pruned from the seed entity graph 207, creating the pruned seed entity graph 208.

At stage B, the graph merger 133 merges the pruned seed entity graph 208 with the seed entity graph 209. In the depicted example, the pruned seed entity graph 208 is comprised of the seed entity 207A and the nodes 207B, 207C, 207D, and 207F. The seed entity graph 209 being merged is comprised of the seed entity 209A and the nodes 209B and 207F. Since both seed entity graphs 208 and 209 share the node 207F, which is a URL, they can be merged on the node 207F. FIG. 2 depicts a merged graph 210 which illustrates both seed entity graphs 208 and 209 merged into a single graph, sharing the node 207F. FIG. 2 depicts an example of two seed entity graphs being merged to create a merged graph, but in practice multiple graphs may be merged into a seed entity graph if they also have a node in common with the seed entity graph. In some cases, if a seed entity graph is not merged because it shares no common nodes with another seed entity graph, the graph itself is treated as a merged graph for the purposes of identifying malicious campaigns.

In this example, the seed entity graphs 208 and 209 were merged based on a single common node. In some cases, multiple nodes may be common across seed entity graphs, and therefore after merging the seed entity graphs, a resulting merged graph can have multiple nodes which have relationships between both of the original seed entity graphs. For example, if a first seed entity graph had the edges A-B and A-C, and a second seed entity graph had the edges B-D and C-D, the merged graph between these two graphs would have the edges A-B, A-C, B-D, and C-D, where the nodes B and C share relationships to both the original seed entity graphs based on the nodes A and D.

Figure 3:
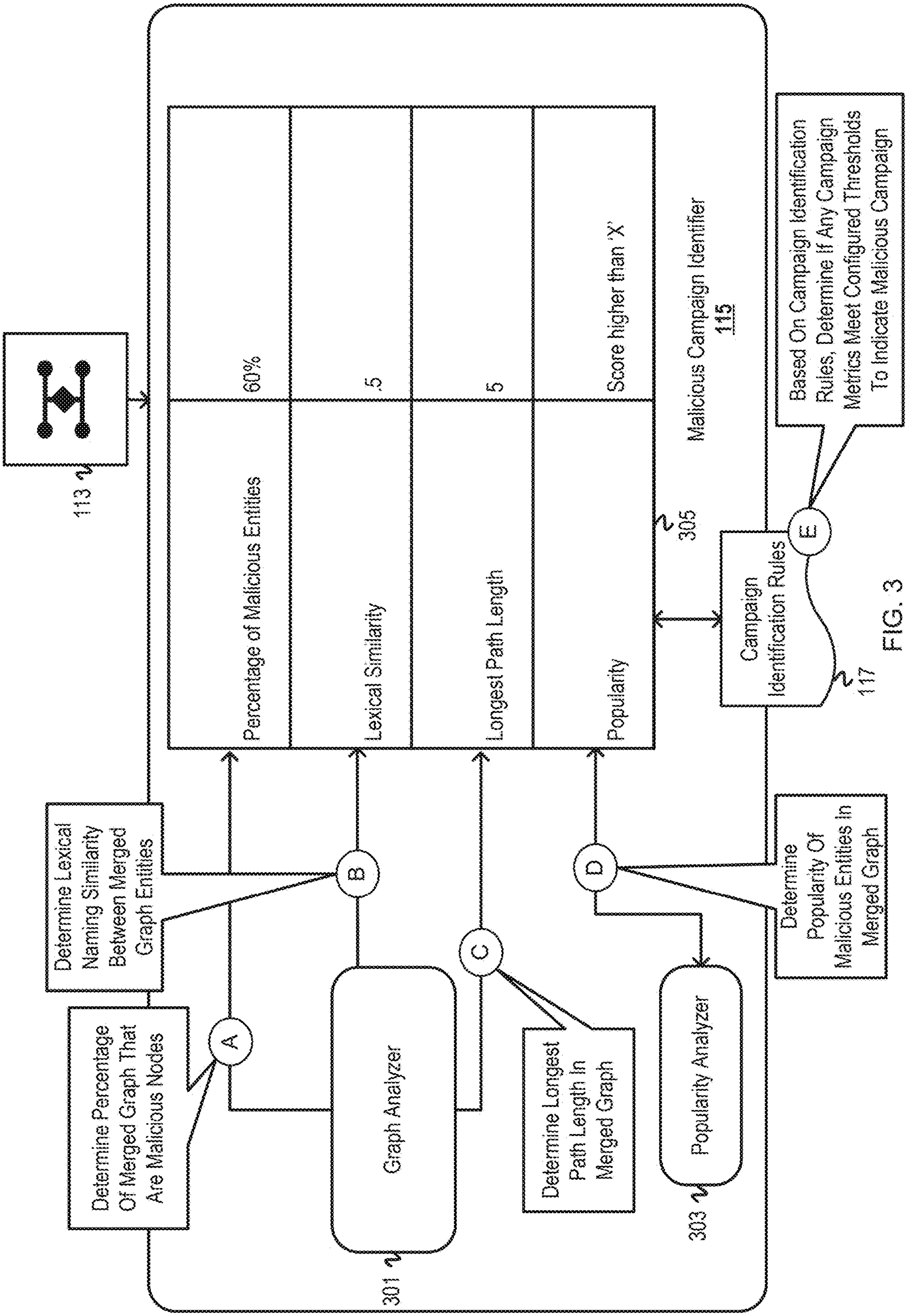
FIG. 3 is an illustrative diagram of a malicious campaign identifier analyzing a merged graph to identify a malicious campaign based on campaign identification rules.

FIG. 3 is an illustrative diagram of a malicious campaign identifier analyzing a merged graph to identify a malicious campaign based on campaign identification rules. FIG. 3 depicts the merged graph(s) 113 being communicated to the malicious campaign identifier 115 and the malicious campaign identifier 115 identifying malicious campaigns in the merged graph(s) 113 as described above in reference to FIG. 1. The malicious campaign identifier utilizes the campaign identification rules 117, which comprises a set of example thresholds 305 to evaluate the merged graph(s) 113. The example thresholds 305 include "Percentage of Malicious Entities", "Lexical Similarity", "Longest Path Length", and "Popularity". Each threshold has a corresponding value that, if reached, is considered an indicator of a malicious campaign. For example, the threshold for "Percentage of Malicious Entities" is depicted as 60%. Therefore, if a merged graph has a percentage of malicious entities over 60% then one of the criteria for the merged graph being identified as corresponding to a malicious campaign is satisfied. Likewise, the thresholds 305 depict the "Longest Path Length" threshold as "5", indicating that a merged graph whose furthest connected nodes are of length 5 or greater apart satisfies a criterion for malicious campaign identification. The thresholds 305 also depict the threshold for "Lexical Similarity" as "0.5". As previously described, lexical similarity can be represented by a normalized value between 0 and 1, where a higher value indicates a higher level of lexical similarity in the names of domain seed entities in a merged graph. In this example, if a merged graph has a determined lexical similarity over the "0.5" value, this indicates the names of domain seed entities in the graph are sufficiently lexically similar to each other. The malicious campaign identifier 115 can compare each pairs of domain seed entities in the merged graph and generate a normalized score for each pair based on the lexical similarity of the names of the pair. The median of the normalized scores for the seed entity pairs is then determined to get a lexical similarity score for the graph. Some thresholds (e.g., Percentage of Malicious Entities, Lexical Similarity, and Longest Path) are based on the graph metadata for the merged graph 113, and therefore the malicious campaign identifier 115 utilizes a graph analyzer 301 to analyze the merged graph to determine any of those thresholds are met. The threshold "Popularity" is based on per-entity metadata which is communicated to a popularity analyzer 303. In this example, the threshold for popularity is based off a score that the popularity analyzer 303 assigns to domain and URL entities in the merged graph 113.

The malicious campaign identifier 115 can be configured to determine that a merged graph corresponds to a malicious campaign based on all criteria (i.e., individual thresholds are met) being satisfied. In some cases, only a subset of criterion may need to be satisfied for a malicious campaign identifier 115 to identify a merged graph as corresponding to a malicious campaign.

FIG. 3 is annotated with the series of letters A-E representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the graph analyzer 301 determines the percentage of nodes in the merged graph 113 that are malicious nodes. The graph analyzer can iterate through the data structure that stores the graph data corresponding to the merged graph 113 and tabulate the number of entities in the graph, and how many of those entities are malicious.

At stage B, the graph analyzer 301 determines the lexical similarity between merged graph entities. To provide an illustrative example, the merged graph 113 may have the five URL entities: "example.com", "example.com", "exampl3.com", "exam-ple.com" and "exampIl.com". Since these URLs are minor variations of each other, they are therefore lexically similar. The graph analyzer 301 compares pairs of names of the seed entities in the merged graph 113 and determines if the median lexical similarity value of these pairs of names is sufficient to indicate that the entities are related and therefore potentially associated with a same malicious campaign.

At stage C, the graph analyzer 301 determines the longest path in the merged graph 113. The graph analyzer 301 can generate a list of paths from any given nodes in the merged graph 113 and sort those paths by longest length. The malicious campaign identifier 115 compares the paths and identifies the longest path whose entities are all malicious.

At stage D, the popularity analyzer 303 determines the popularity of malicious entities in the merged graph 113.

Popularity corresponds to domain and URL entities in the merged graph 113. The popularity analyzer 303 can query a service or database which stores data about entity popularity to retrieve popularity data for each domain and URL entity. Popularity data may be a ranking of entities based on their viewership (i.e., how many users visit those entities), or based on a number of visitors over a certain time period (e.g., 1000 visitors per day). Based on this data, the popularity analyzer can assign a score to domain and URL entities based on their popularity data. Higher popularity scores correspond to more popular entities.

At stage E, the malicious campaign identifier 115, based on the campaign identification rules 117, determines if any of the campaign metrics determined in stages A-D meet the configured thresholds to indicate a malicious campaign. The malicious campaign identifier 115 compares each metric determined to its corresponding threshold as defined by the campaign identification rules 117. If any threshold is met, the malicious campaign identifier 115 indicates the merged graph 113 corresponds to a malicious campaign. In some implementations, the malicious campaign identifier may require multiple thresholds to be met for the merged graph 113 to be identified as corresponding to a malicious campaign.

Figure 4:
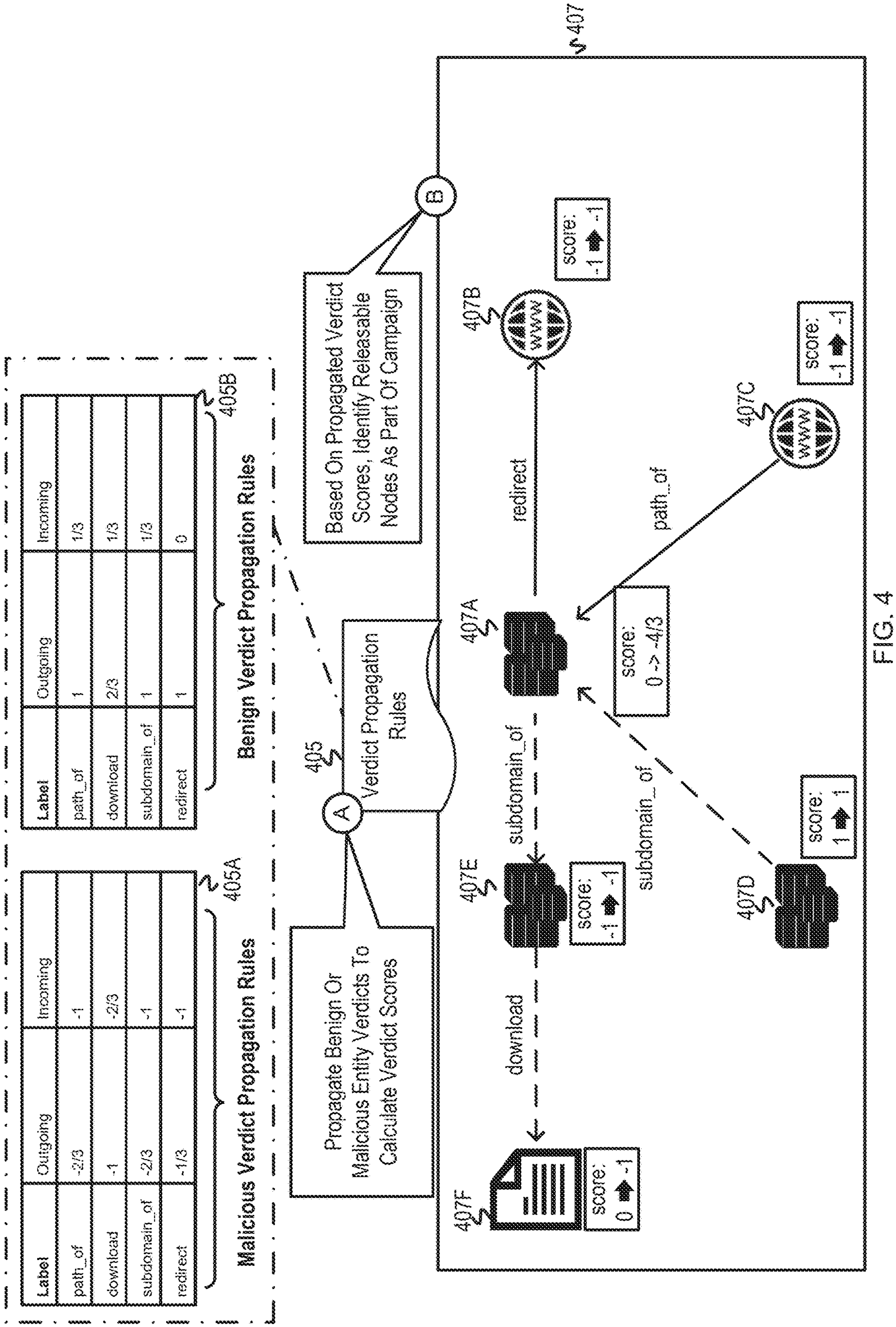
FIG. 4 is a schematic diagram of the malicious campaign detection system propagating verdicts to obtain verdict scores for nodes in malicious campaign graphs.

FIG. 4 is a schematic diagram of the malicious campaign detection system propagating verdicts to obtain verdict scores for nodes in malicious campaign graphs. By propagating verdict scores between nodes in the malicious campaign graph, the malicious campaign detection system can determine which nodes are important and should be released alongside a malicious campaign description. Verdict propagation is the process of modifying the verdicts of nodes in a malicious campaign graph based on verdicts of adjacent nodes in the malicious campaign graph based on predefined verdict propagation rules. The operations described in FIG. 4 presume a merged graph has already been identified as corresponding to a malicious campaign and therefore will refer to the merged graph as a "campaign graph."

FIG. 4 depicts a set of verdict propagation rules 405, which are divided into a set of malicious verdict propagation rules 405A and a set of benign verdict propagation rules 405B. Each set of rules has a list of labels which correspond to relationships between entities (e.g., "path_of", "download", "subdomain_of", etc.). Only a subset of possible relationships is depicted in FIG. 4 for brevity. Associated with each label is both an incoming edge score and an outgoing edge score. An example of an outgoing edge is a first domain connected to a second domain with the edge label "subdomain_of", where the edge points from the first domain to the second domain. In this example, the second domain would have the incoming edge "subdomain_of", indicating it is a parent domain to the first domain.

FIG. 4 depicts a campaign graph 407 with nodes 407A-407F. Each of the nodes 407A-407F is depicted with an initial verdict score and an arrow pointing to a post-propagation verdict score, representing initial verdicts changing. In this example, an initial verdict score of 0 means the entity was determined as being neither malicious nor benign based on verdict data retrieved about that entity. A score of 0 can also represent an entity who had mixed verdict data, resulting in an inconclusive determination. FIG. 4 depicts the nodes 407B, 407C, and 407E as being initially malicious, represented by their initial verdict score of −1. The node 407D is depicted as initially benign as represented by its initial verdict scorer of 1. The nodes 407F and 407A are depicted with initial verdict scores of 0.

FIG. 4 is annotated with the letters A and B representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the malicious campaign detection system propagates entity verdicts from benign/malicious entities to calculate verdict scores for directly connected entities. For example, if a campaign graph has three nodes A, B and C, and those nodes were connected by the edges A-B and B-C, the node A would have its score influenced by the node B, but not node C since there is no direct connection. The score changes for each label and edge type in the verdict propagation rules 405 correspond to the confidence of the relationship. In this example, score changes vary between the values 0 and 1 or −1, where 0 has no confidence and 1 or −1 has the highest confidence. A negative value for a score indicates a high confidence level for maliciousness, whereas a positive value indicates a high confidence level for benignity. For example, an entity with a score of 0.5 is less confidently determined to be benign than an entity with a score of −1 that is confidently determined to be malicious. A high verdict score change in a malicious verdict propagation rule indicates the relationship between the two entities is a likely indicator of maliciousness between the entities. Likewise, a high verdict score change in a benign verdict propagation rule indicates a high likelihood of benignity between the entities. In cases where a node has relationships with both benign and malicious entities, the aggregate in the scores based on the relationships with both the benign and the malicious entities will be used to calculate a final scoring of maliciousness or benignity based on the node's initial verdict.

To provide an illustrative example of how verdict propagation is performed, consider the domain entity 407A in the campaign graph 407 with the score change of 0 to −5/3. The starting score of 0 indicates the domain entity 407A had no verdict of maliciousness or benignity to begin with or that the domain entity 407A had conflicting verdict data which resulted in the entity being determined as neither benign nor malicious. The domain entity 407A is depicted connected to the entities 407B-407E. Each of these entities has a relationship with the domain entity 407A as well as an initial verdict scoring as well. As depicted in FIG. 4, the entities 407B, 407C, and 407E have initial verdict scorings of −1, and therefore the malicious verdict propagation rules 405A are used to distribute their verdicts to the domain entity 407A. The URL 407C has an incoming edge "path_of" to the domain entity 407A. Referencing the malicious verdict propagation rules 405A, an incoming edge "path_of" has the score modifier of −2/3. Following the same process, the URL entity 407B has as edge with the score modifier −1/3 and the domain entity 407E has an edge with the score modifier −2/3. The aggregated score modifier for the connected malicious entities is −5/3. The domain entity 407D had an initial verdict scoring of 1, and therefore the verdict propagation for this connected entity will use the benign verdict propagation rules 405B. The domain entity 407D has an incoming edge which has the score modifier 1/3. By adding the malicious entity score modifiers to the benign score modifier (i.e., −5/3+1/3), the final score modifier of −4/3 is determined. The final score modifier is added to the initial verdict scoring of the domain entity 407A (which is 0) to get a final verdicts score change from 0 to −4/3.

Each entity/node in the campaign graph 407 is evaluated following the above-described method. FIG. 4 depicts the URL entity 407B with the verdict score change from −1 to −1, the URL entity 407C with the verdict score change from −1 to −1, the domain entity 407D with the verdict score change from 1 to 1, the domain entity 408E with the verdict score change from −1 to −1, and the file entity 407F with the verdict score change from 0 to −1. Verdict scores are propagated only from entities that are determined as initially benign or malicious. Entities with an initial verdict score of 0 do not propagate their verdict scores to connected entities.

The example described in FIG. 4 depicts one iteration of verdict propagation. In some cases, the system can perform multiple iterations of verdict propagation on a campaign graph.

At stage B, the malicious campaign detection system identifies releasable nodes as part of the campaign based on the propagated verdict scores. The nodes 407A, 407B, 407C, 407E and 407F all have a final negative score and are identified by the malicious campaign detection system as candidates for release. This indicates that alongside the campaign description, the entities corresponding to the aforementioned nodes will have their metadata published alongside the campaign description for the campaign based on the campaign graph 407, allowing users to view data about each individual releasable entity as well as the data about the campaign as a whole.

FIG. 5 is an illustrative diagram of a campaign analyzer prompting a language model to generate a malicious campaign description based on campaign graph metadata. FIG. 5 depicts the campaign analyzer 119, the language model 125, and one of the malicious campaign graphs 500 included in the malicious campaign graph(s) 114 described above in reference to FIG. 1. The campaign analyzer 119 generates a campaign graph representation 501, which is a data structure that stores the graph data for the campaign graph(s) 500 in a format that can be understood by the language model 125 (e.g., the JSON format). Based on the campaign graph representation 501, the campaign analyzer 119 generates an example prompt 502. FIG. 5 depicts some contents of the example prompt 502, the full content of the example prompt 502 is:

Setting Context:

The cluster information is provided in the form of a JSON.

The json_item["seeds"] contains the list of nodes that should be considered the seed nodes in the cluster.

Each node is described under json_item['graph']['nodes']. The label describes the type of node (domain/IP address/URL/File Sample). The 'verdict' field describes the maliciousness of the node. A high verdict value is considered highly malicious.

The json_item['graph']['edges'] field describes the relationships and edges between different nodes. The label at each edge represents the relationship between the source and destination.

This is what each label means:

Resolve_a_to means that source resolves to the destination IP address.

Resolve_ns_to means that the source's authoritative nameserver is the destination node.

Redirect means source redirects to the destination.

Path_of means source is a URL path under the destination.

Subdomain_of means that source is a subdomain of the destination.

Download means source downloads the destination node.

Contact means that the source (file) contacts the destination.

Contain means that the source (file) contains the destination.

Labels starting with "whois" mean that the destination is the value in the source's WHOIS data in the field specified by the label.

Prompt:

Analyze the following campaign graph:

{CAMPAIGN GRAPH}

Using this information, write one concise paragraph (less than 100 words) highlighting:

1. The main relationships shared by the seed nodes
2. Any relationship that malware samples have to important nodes in the graph
3. Seed naming pattern that indicates abuse
4. What type of edge is most often seen in the campaign graph
5. Reason about how attackers may be leveraging the highly malicious nodes in this graph.

As depicted above, the example prompt comprises the sections "SETTING CONTEXT" and "PROMPT". The "SETTING CONTEXT" section provides contextual information in the prompt which helps guide the language model 125 when interpreting the graph data. The section describes the graph structure of the campaign graph(s) 500 and the meaning of the graph edges (i.e., the entity relationships). The prompt section "PROMPT" comprises the graph data (labeled "CAMPAIGN GRAPH") and instructions to generate a description of the campaign that highlights certain important data. The important data specified by the example prompt 502 for the language model 125 to highlight when analyzing the graph data include: the main relationships shared by seed nodes (i.e., nodes in the campaign graph which seed entity graph were based on), relationships that malware samples have to important nodes in the graph, naming patterns in seed nodes that indicate abuse, the most common type of relationship in the campaign graph, and a reasoning for how attackers may be leveraging the most malicious entities in the campaign. The campaign analyzer 119 communicates the example prompt 502 to the language model 125 and invokes the language model 125 on the example prompt 502 to generate the malicious campaign description 504. FIG. 5 depicts the example malicious campaign description 504 as:

Campaign Information:

Name: example_1

Nicknames: example_1

Description: The example_1 campaign comprises 8 registered domains that are contacted by 3 malware samples that are downloaded from 2 IPs. They contact various URL paths under these registered domains, and these paths contain encoded strings which potentially include exfiltrated data. Beyond this, the campaign also includes related malware samples and Uniform Resource Locators (URLs) contacted by them.

Status: pending release

Severity: Critical

Created at: *example date-time*

FIGS. 6-9 are flowcharts of example operations relating to the identification and monitoring of malicious campaigns. The example operations are described with reference to a malicious campaign detection system for consistency with FIGS. 1-5 and/or ease of understanding. The name chosen for the program code is not to be limiting on the claims.

Structure and organization of a program can vary due to platform, programmer/architect preferences, programming language, etc. In addition, names of code units (programs, modules, methods, functions, etc.) can vary for the same reasons and can be arbitrary. All flowchart descriptions may refer to the malicious campaign detection system simply as the "system" for brevity.

Figure 6:
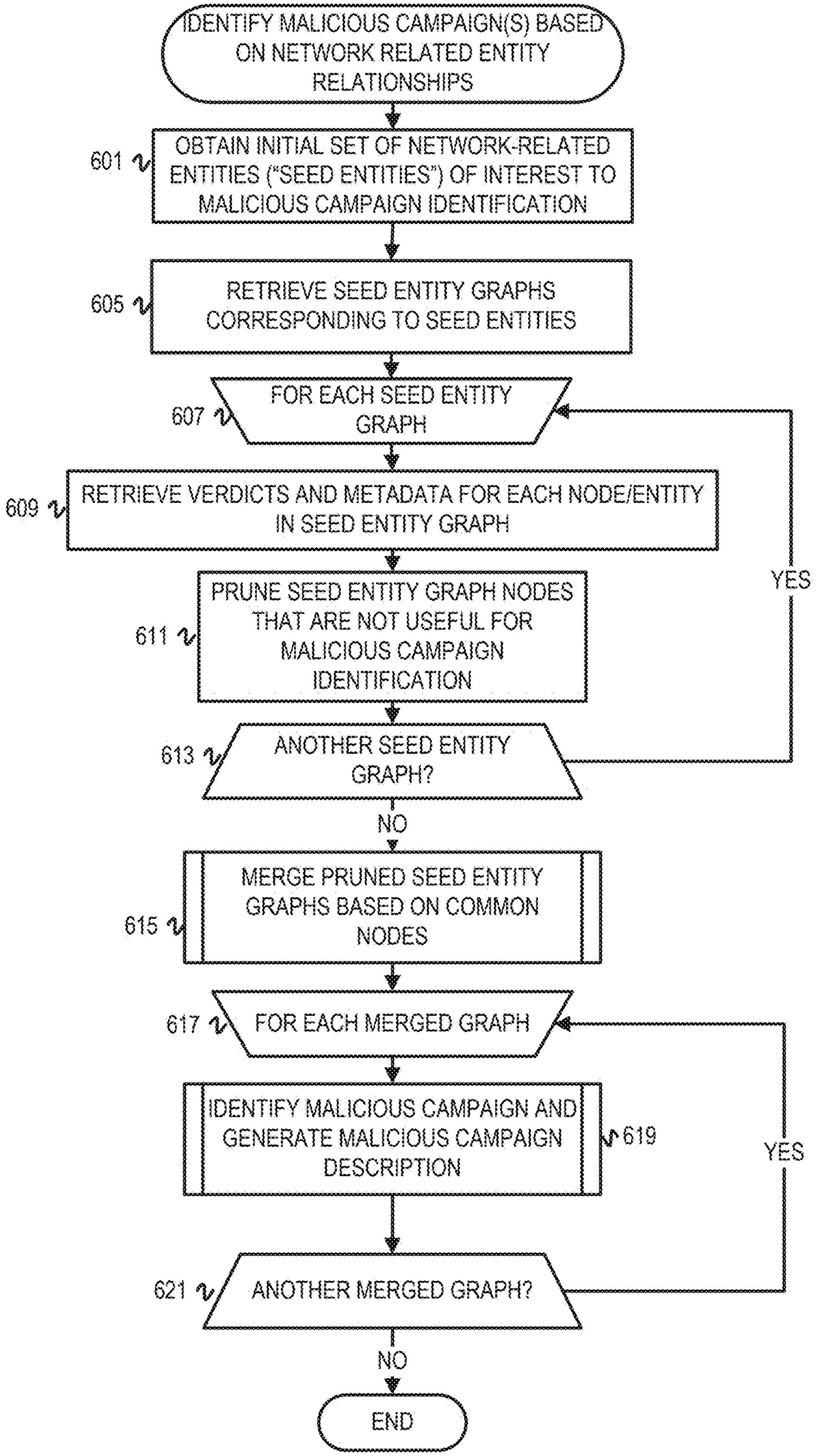
FIG. 6 is a flowchart of example operations for identifying a malicious campaign(s) based on network entity relationships.

FIG. 6 is a flowchart of example operations for identifying a malicious campaign(s) based on network entity relationships. At block 601, the malicious campaign detection system obtains an initial set of network-related entities (henceforth "seed entities") of interest to malicious campaign identification. As described above, network entities in this example include domains, URLs, IP addresses, and files such as malware samples. The malicious campaign detections system can obtain a set of identifiers corresponding to network entities that have been previously determined by a subject matter expert or user of the system to potentially include network entities that may be members of a malicious campaign. Identifiers in this context are information used to identify the domain entity. For example, an IP address can be identified by either an IPv4 or IPv6 address. If the network entity is a domain or URL, the string representation of the domain name or URL name is the identifier. A malware sample can be identified by the name of the file storing the sample. In some cases, the malicious campaign detection system may be subscribed to a dataset/data service of network entities that represent of -interest network entities for malicious campaign identification and periodically query that dataset to obtain the set of network entities to analyze.

At block 605, the system retrieves seed entity graphs corresponding to the seed entities. The system can query an entity graph database (e.g., GraphDB) that stores graph data corresponding to each seed entity and retrieve the corresponding graph data. If a seed entity does not have graph data, the system will exclude the entity for the purposes of malicious campaign identification. The graph database may store data in a format such as the JSON format which is compatible with a data model such as the RDF data model which specializes in representing graphs. The retrieved data can be in common JSON-based RDF serialization formats such as JSON-Linked Data or RDF/JSON which the system can interpret. The graph data for a seed entity graph includes data on the graph nodes (i.e., the network-related entities connected to the seed entity as well as the seed entity itself), and graph edges (i.e., the relationships between network entities). Graph edges can be directed, meaning the relationship determined by the label of the edge represents an "is-a" or "has-a" relationship in the direction of the edge. For example, if a directed edge from a first domain was directed to a second domain, and the edge label was "subdomain_of", then that indicates the first domain is a sub-domain of the second domain. The system can be configured to retrieve the graph data for a number N (e.g., N=100) of the most proximal entities to the seed entity. By most proximal, this refers to entities that have the shortest length from the seed entity in the graph structure. A breadth-first search on the graph database can be performed to retrieve the graph data for the most proximal entities to the seed entities.

At block 607, the system begins iterating through each seed entity graph retrieved in the operations of block 605. For each selected seed entity graph, operational flow continues at block 609.

At block 609, the system retrieves verdicts and metadata for each node/entity in the seed entity graph. As described in reference to FIG. 1, the system can retrieve verdicts and metadata from data sources such as FP check (a fingerprinting service), Indication of Behavior (IOB) and Indication of Compromise (IOC) databases, WHOIS domain databases, Passive DNS stores, and the VirusTotal® scanner. Verdicts can indicate that a network entity is benign, malicious, or neither (i.e., cases where the data source does not have data on that entity). Metadata can include information such as an entity's registration date for domains and URL entities or download dates and sources for malware samples. As previously described, an entity can have conflicting verdicts based on the source of the verdict. In this case, the system can assign weights (i.e., a score) to each verdict and combined the verdicts to determine an aggregate verdict to assign to the entity.

At block 611, the system prunes nodes from the selected seed entity graph that are not useful for malicious campaign identification. The system uses the retrieved verdict information to prune nodes that correspond to either a benign noisy node, or a benign leaf node. A benign noisy node represents an entity that is popular to the degree that its presence in the graph would not likely provide useful context about a potential malicious campaign. An example of a benign noisy node would be a popular name server that is used by a variety of other network-related entities but is itself benign. A large number of network entities may use the name server, and therefore the name server is noisy because it connects network entities to the seed entity through relationships that likely do not indicate the presence of a malicious campaign. A benign leaf node is a node with only incoming directed edges and no outgoing edges (i.e., it has a relationship to an entity in the graph, is benign, but no other entity in the graph derives its relationship from the benign leaf node). For example, an entity can download a file from a web page associated with an IP address, and that file can have a benign verdict. Since the file is benign and no entities in the graph derive their relationship from the file (i.e., the file does not have an outgoing edge pointing to another entity), the file is therefore a benign leaf node. The verdict data retrieved as described in reference to the operations of block 609 are used by the system to determine which nodes in the seed entity graph correspond to benign and malicious nodes for the purposes of pruning.

At block 613, the system determines if there is another seed entity graph to process. If there is another seed entity graph to process, then operational flow continues at block 607. Otherwise operational flow continues at block 615.

At block 615, the system merges seed entity graphs based on their common nodes. A merged graph comprises all the nodes and edges of individual seed entity graphs that share one or more common nodes. This operation is further described in FIG. 7.

At block 617, the system beings to iterate over each merged graph. For each merged graph, operational flow continues at block 619.

Figure 8:
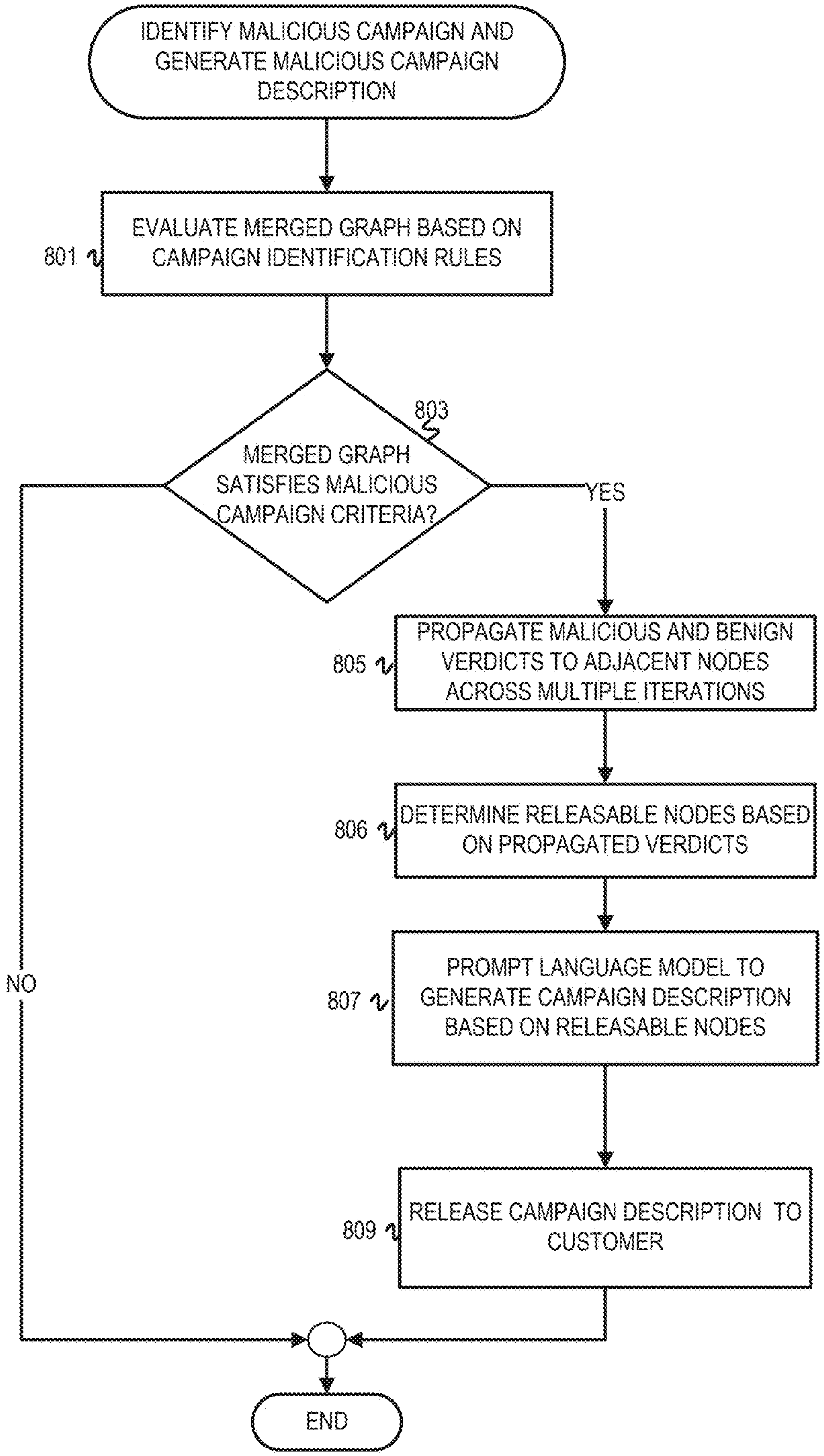
FIG. 8 is a flowchart of example operations for identifying malicious campaigns and generating malicious campaign descriptions.

At block 619, the system identifies malicious campaigns and generates a malicious campaign description for each identified malicious campaign. The system analyzes each merged graph and identifies merged graphs that correspond to a malicious campaign based on a set of campaign identification rules. Upon identifying merged graphs that correspond to malicious campaigns ("campaign graphs"), the system then performs analysis on the campaign graphs to determine which entities in the graph are important for providing contextual information about the malicious campaign. The system generates a malicious campaign description based on each campaign graph and releases the campaign description along with the metadata of the corresponding nodes determined as contextually important to the campaign. FIG. 8 further describes the operations for identifying malicious campaigns, generating the malicious campaign descriptions and determining the corresponding releasable nodes.

Figure 7:
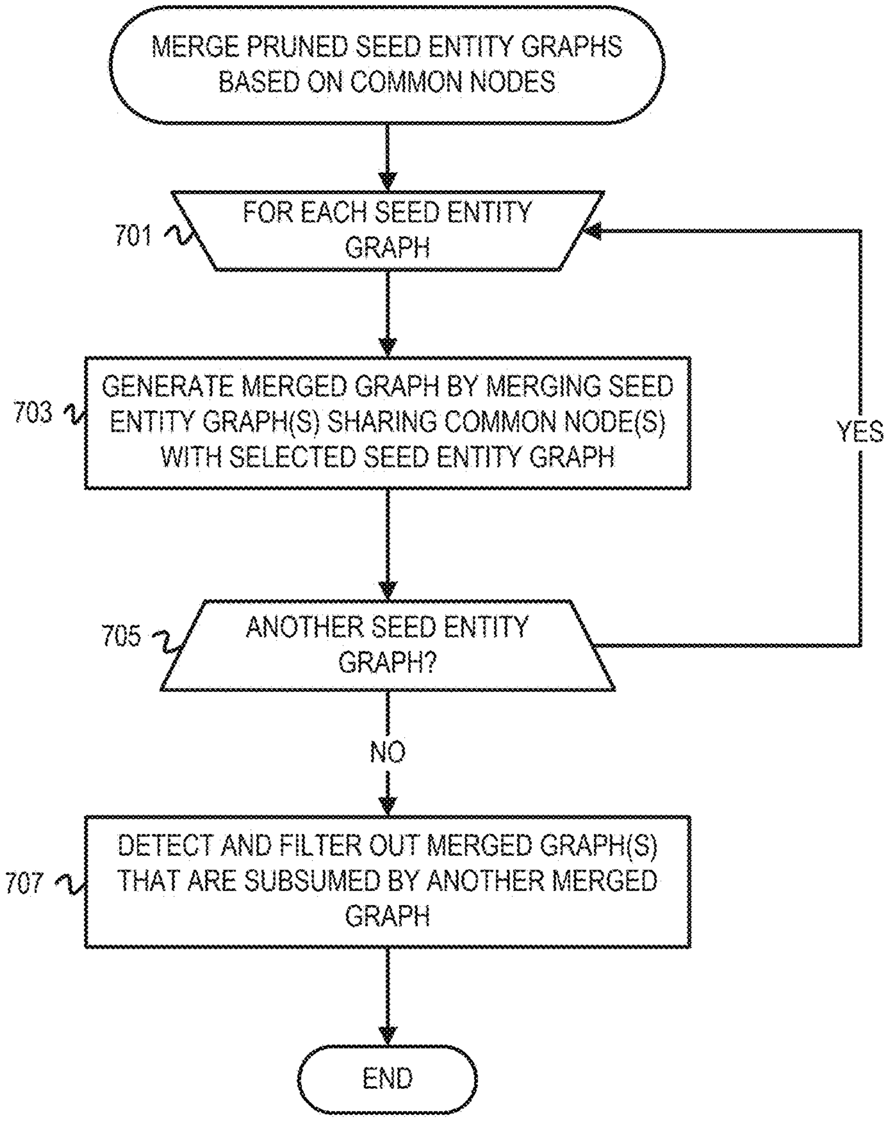
FIG. 7 is a flowchart of example operations for merging pruned seed entity graphs based on common nodes.

FIG. 7 is a flowchart of example operations for merging pruned seed entity graphs based on common nodes. The operations of FIG. 7 presume that the malicious campaign detection system has retrieved a plurality of seed entity graphs as described by the operations of FIG. 6.

At block 701, the malicious campaign detection system determines whether a pair of a current set of graphs have a common node(s). The current set of graphs is initialized as the seed entity graphs, and then merged graphs are added at further iterations. As pairs of current graphs having common node(s) are identified by the malicious campaign detection system, each pair is flagged by the malicious campaign detection system to not be chosen at future iterations.

At block 703, the malicious campaign detection system generates a merged graph from the pair of current graphs and adds the merged graph to the set of current graphs. In some instances, a merged graph can include more than two of the initial seed entity graphs. As an example, if graphs A and B were merged into a graph M1 at a previous iteration, and M1 has overlap (i.e. a common node(s)) with graph C, then a new merged graph M2 would include A, B, and C.

At block 707, the malicious campaign detection system detects and filters out merged graph(s) that are subsumed by another merged graph. To determine if any merged graphs are subsumed, the system can generate a list of seed entities found in each merged graph. The system then can compare lists of seed entities to determine if all the seed entities within a merged graph also appear in another merged graph. For example, if a first merged graph comprises the seed entities A, B, C and D and a second seed entity graph comprises just the seed entities A, B and C, then the second graph will be detected as being subsumed by the first graph. The system filters out merged graphs that are subsumed by other merged graphs. If two or more merged graphs are detected to have the exact same set of unique seed entities, the system will filter out all but one of the similar merged graphs to remove redundant merged graphs.

FIG. 8 is a flowchart of example operations for identifying malicious campaigns and generating malicious campaign descriptions. The operations of FIG. 8 presume that a merged graph of one or more seed entity graphs has been generated using the operations described in FIG. 6. The operations of FIG. 8 also presume that the malicious campaign detection system has retrieved, for each node in the merged graph, verdicts and metadata for the corresponding entities.

At block 801, the malicious campaign detection system evaluates the merged graph based on campaign identification rules. Evaluation of the merged graph in this example comprises determining if the merged graph satisfies individual criterion defined by the campaign identification rules. The campaign identification rules correspond to a set of thresholds for metrics that the system uses to determine if a merged graph indicates behaviors that are consistent with a malicious campaign. Each rule can be thought of as an individual indicator that a graph corresponds to a malicious campaign. As described in FIG. 3, campaign identification rules can include thresholds for merged graph metrics, such as the percentage of malicious entities in the merged graph, the lexical similarity in the naming of the seed entities, the longest path length, and the popularity of malicious nodes in the graph. In some cases, additional metrics can be evaluated such as the percentage of malicious malware samples, and commonality of entity registration dates.

At block 803, the malicious campaign detection system determines if the merged graph satisfies malicious campaign criteria. Malicious campaign criteria in this example are based on the number of thresholds that are met by the merged graph as described in block 801. The system determines if enough thresholds are satisfied to identify the merged graph as a malicious campaign. The system may be configured such that all thresholds defined by the campaign identification rules should be met for a merged graph to be identified as corresponding to a malicious campaign. In some cases, the system may be configured so that a subset of the thresholds defined by the campaign identification rules need to be satisfied for a merged graph to be identified as corresponding to a malicious campaign. If the system determines the merged graph satisfies the malicious campaign criteria, then the graph is identified as corresponding to a malicious campaign ("campaign graph") and operational flow continues at block 805. Otherwise, operations in FIG. 8 will conclude.

At block 805, the malicious campaign detection system propagates the malicious and benign verdicts of nodes/entities in the campaign graph to their adjacent nodes across multiple iterations of verdict propagation. The purpose of performing verdict propagation across nodes in the campaign graph is to determine which entities in the malicious campaign are important to the campaign and provide context about how the campaign is structured and therefore should be releasable in association with the campaign (e.g., in public documentation of the campaign provided to customers). Each entity in the campaign graph has an initial verdict based on the retrieved verdicts as described in FIG. 6. An entity can either have an initial undefined/neutral verdict, a malicious verdict, or a benign verdict. The system assigns a value to each of these verdicts which represents an initial score for the verdict (e.g., malicious=−1, neutral/undefined=0, and benign=1). The system can use a set of verdict propagation rules, which comprises a listing of possible relationships between pairs of entities, and a score modifier assigned to each relationship based on the initial verdict of the entity being propagated from. For example, if an entity has a benign verdict, then it will propagate its verdict to adjacent entities by modifying their initial verdict score to indicate a higher level of benignity (i.e., its verdict score increases in the positive direction). Entities with initial neutral verdicts do not influence the verdicts of adjacent nodes, however in cases where multiple iterations of verdict propagation is performed on the campaign graph, entities with initial neutral verdicts may be modified to have other than neutral verdicts, and therefore during subsequent iterations of verdict propagation the entities are no longer considered as being "neutral" for the purposes of verdict score calculation.

For each node ("selected node"), the system determines the relationships the selected node has with adjacent nodes, including the direction of the relationship. For example, consider an example for an entity of an IP address having a relationship with a malware sample where the malware sample was downloaded from the IP address. The relationship "download" therefore would be directed from the IP address to the malware sample. This means that from the perspective of the malware sample, the "download" relationship is an incoming relationship, and from the perspective of the IP address, the "download" relationship is outgoing. The system looks up the corresponding verdict score modifier in the verdict propagation rules for each relationship the selected node shares with an adjacent node (that does not have a neutral/undetermined verdict) and updates the initial verdict score of the selected node based on the looked-up score modifiers. After this process is followed for each node in the campaign graph, the verdict scores have been propagated. Some nodes may not have their scores updated from their original verdict scores (i.e., because they were only adjacent to undetermined/neutral nodes or their verdict score was equally modified in both the malicious and benign directions (e.g., malicious verdict modifier of −2+benign modifier of 2=0)). The higher the verdict score in both negative and positive directions, the more confidence in the entity's status there is. For example, a domain with a verdict score of −1 is malicious, but carries a lower confidence level than a domain with a domain with a verdict score of −5. Likewise, a domain with a verdict score of 1 is benign, but that verdict represents a lower level of confidence than an entity with a benign score of 5. The operations described in block 805 may be performed multiple times using the PageRank algorithm to increase the confidence of verdict scores that are propagated. The system can be configured to perform a number N (e.g., N=100) of iterations of verdict propagation. If during an iteration of verdict propagation the system detects that verdict scores have not changed since the previous iteration (i.e., the verdict scores have converged) then the operations for verdict propagation will conclude. Verdict propagation can occur in two stages-propagation of malicious verdicts and propagation of benign verdicts to adjacent nodes until convergence according to the algorithm being used for propagation. Each node has a resulting malicious and benign score after the propagation, and a final score or verdict for each node can be determined by comparing the malicious and benign scores at each verdict (e.g., by adding the scores).

Figure 9:
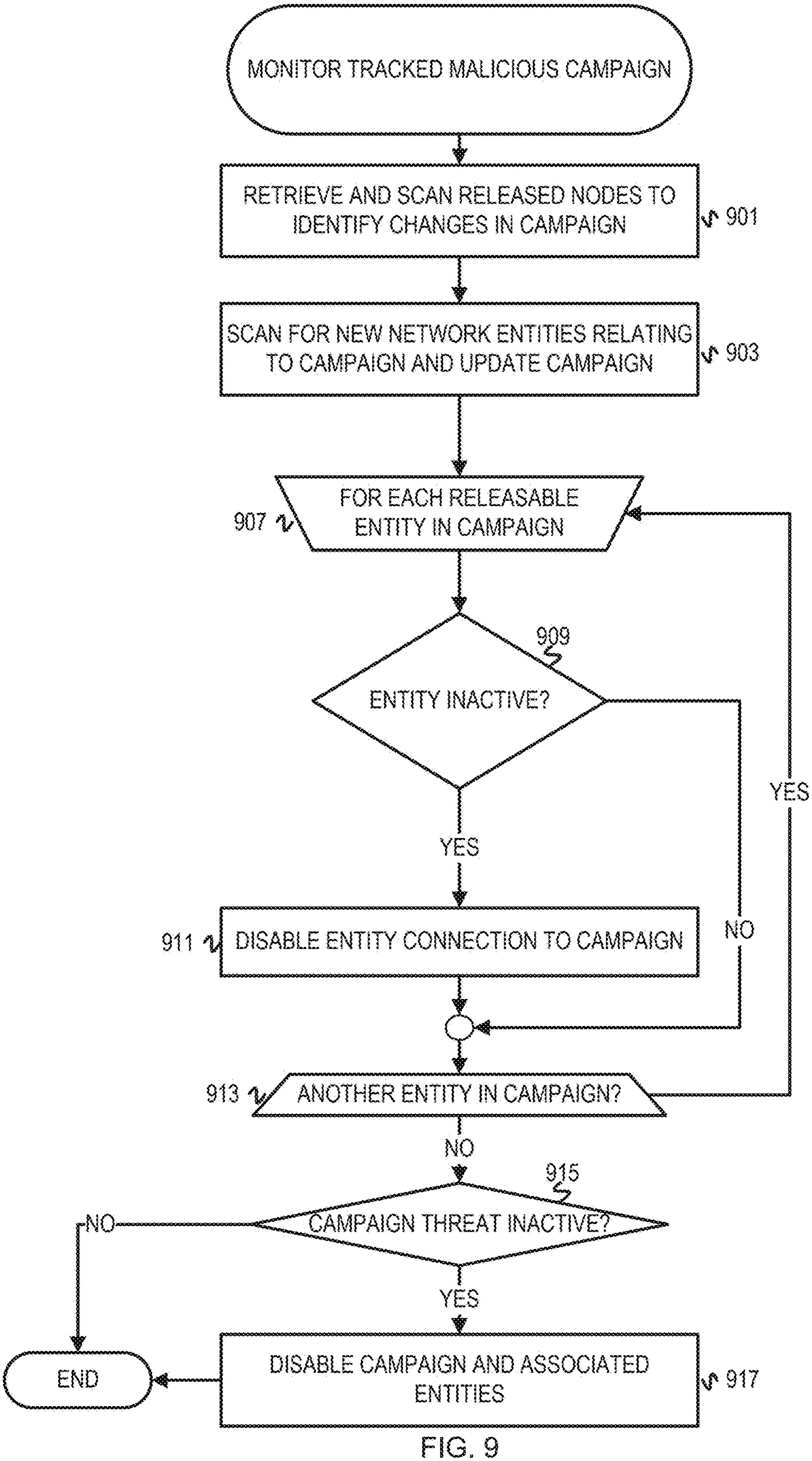
FIG. 9 is a flowchart of example operations for monitoring tracked malicious campaigns.

At block 806, the malicious campaign detection system determines the releasable nodes based on the propagated verdicts. Based on the verdict scores propagated as described in block 705, nodes/entities in the campaign graph with a net-negative verdict scoring (i.e., <0 verdict score) after propagation is identified as a releasable (i.e., important for campaign context) node. Entities identified as releasable are indicated as such by the system. After releasable entities are identified by the campaign graph, the system may also save the campaign graph data to a database of malicious campaigns so the campaign can be monitored. FIG. 9 further describes the operations of monitoring a determined malicious campaign. Verdict scores in some cases may be represented as their absolute value for releasable nodes (since benign nodes are not evaluated when generating a campaign description), where a higher value for a verdict score for a releasable node indicates a higher level of maliciousness.

At block 807, the malicious campaign detection system prompts the language model to generate a campaign description based on the releasable nodes. The prompt comprises the graph data for the malicious campaign with indications of the releasable nodes, a contextual description of the graph data, and instructions to generate the campaign description. An example campaign description that can be generated from prompting the language model is the following:

```
{
Name: formbook_c2
Nicknames: formbook_c2
Description: The formbook_c2 campaign comprises 8 stockpiled and newly registered
domains that are contacted by 3 formbook malware samples that are downloaded from 2
IPs. They contact various URL paths under these newly registered domains, and these
paths contain encoded strings which potentially include exfiltrated data. Beyond this, the
campaign also includes related malware samples and URLs contacted by them.
Status: released
Severity: critical
Created At: 2024-09-05 18:18:04 (UTC)
Updated At: 2024-09-05 18:18:04 (UTC)
}
```

The above campaign description comprises a subset of information that a campaign description may have. In some cases, a subject matter expert may review the campaign description to verify its completeness and accuracy. The campaign description is given a name, and a severity level. Campaign names are typically manually assigned and generally identify the type of threat posed by the campaign as well as behavior of the campaign based on the campaign description. For example, an adware threat which has the behavior of distributing android package kits (apks) could have the name "adware_apk_distribution1". The severity level indicates how much of a threat the malicious campaign is.

At block 809, the malicious campaign detection system releases the campaign description to the customer. This operation can comprise the system publishing the campaign description and the metadata for the releasable nodes for customers to view. A customer can then view the campaign description as well as view the data about the important nodes in the malicious campaign to gain insight into the campaign's structure and how the important malicious entities in the campaign interact.

FIG. 9 is a flowchart of example operations for monitoring tracked malicious campaigns. As described in FIG. 8, malicious campaigns are identified and their releasable nodes are analyzed, with descriptions thereof stored so that campaigns can be periodically monitored for changes. A malicious campaign may evolve over time, and therefore the important entities in a campaign may change, or the structure of the campaign may change as the campaign moves to a different stage in its attack. Alternatively, some malicious campaigns may be deactivated or removed from further monitoring if they are determined to no longer be a threat. The operations described in FIG. 8 assume that a malicious campaign has already been identified and that its data is recorded in a database of malicious campaigns. The operations described in FIG. 9 can be performed periodically or performed based on a command (i.e., such as an application programming interface (API) request) sent the malicious campaign detection system to trigger an update to existing malicious campaigns.

At block 901, the malicious campaign detection system retrieves and scans released nodes for changes in the campaign. The system can query the database of malicious campaigns and retrieve the listing of releasable nodes for that campaign. Based on the listing, the system can scan the releasable nodes by querying data sources that store network entity metadata (e.g., WHOIS datasets) and comparing the stored metadata for the entities to see if entity status has changed, or if there is additional information about the entities. The system also retrieves seed entity graph data corresponding to each releasable node. If a seed entity graph for a releasable node no longer indicates the common nodes that were originally observed to be part of the malicious campaign (i.e., the common nodes that the seed entity graphs were merged on as described in block 703), the releasable node is determined as inactive. If an entity has changed, the system can update the malicious campaign database with the new information. If an entity's status has changed such that it is no longer active (e.g., a domain is no longer reachable), then the entity is indicated as inactive by the system.

At block 903, the malicious campaign detection system scans for new entities relating to the campaign and updates the campaign. The system can scan a database of newly registered/created/logged entities (e.g., NRD databases for domains) and retrieve a set of new entities. For each new entity, the system retrieves the verdict information for the corresponding entities as well as metadata about the new entities relationships. Using relationship metadata obtained from the data sources, the system then determines if the new entities have direct relationships with any of the releasable entities in the malicious campaign (i.e., they would be adjacent to releasable nodes in the malicious campaign if added to the campaign graph). If any of the new entities are determined to have direct relationships with releasable entities in the malicious campaign, the campaign graph data for the malicious campaign is updated to include the new entities with the direct relationships.

As new entities and their relationships are added to the campaign graph data, the malicious campaign detection system may be configured to perform verdict propagation across the new entities following the operations described in FIG. 4. If the new entities indicate a net-malicious verdict scoring after verdict propagation, the new entities are also indicated as releasable by the malicious campaign detection system. New entities indicated as releasable are released along with their metadata so users can view the new entities associated with the existing malicious campaign.

Based on whether the malicious campaign was updated with new entities or if entities in the campaign were updated as described in block 801, the system may generate a new malicious campaign description (e.g., following the process described in FIG. 8) or update an existing malicious campaign description.

At block 907, the malicious campaign detection system beings to iterate through each releasable entity in the malicious campaign. For each releasable entity in the malicious campaign, operational flow continues at block 909.

At block 909, the malicious campaign detection system determines if the entity is inactive. The system checks if the entity was indicated as inactive based on a potential change in status as described in block 901. If the entity was indicated as inactive, operational flow continues at block 911. Otherwise, operational flow continues at block 913.

At block 911, the malicious campaign detection system disables the entity connection to the campaign. Disabling the connection can comprise the system removing from the malicious campaign graph data the connection(s) from the entity to other entities in the campaign the campaign and indicating the entity is no longer releasable. In some cases, the system may remove the entity from the campaign data along with its connection data if an indication of inactivity is sufficient for the system to consider an entity no longer of interest for providing context about a malicious campaign. Operational flow continues at block 913.

The malicious campaign detection system determines whether the entity was previously released in association with a corresponding malicious campaign.

If the entity was not previously released, the malicious campaign detection system releases the entity in association with the corresponding malicious campaign. For instance, the malicious campaign detection system can communicate metadata of the entity to a module that generates and releases malicious campaign descriptions.

At block 913, the malicious campaign detection system determines if there is another releasable entity in the malicious campaign to process. If there is another releasable entity, then operational flow returns to block 907. Otherwise, operational flow continues at block 915.

At block 915, the malicious campaign detection system determines if the campaign threat is inactive. The system determines whether there are still sufficient indications of a malicious campaign being a threat to warrant the campaign being declared an active campaign. One way the system can determine if a campaign threat is still active is based on the number of releasable nodes in the campaign. If the number of releasable nodes falls below a certain threshold configured by the system (i.e., because individual entities became disabled as described in block 911), then the system can reclassify the campaign as an inactive threat. Alternatively, entities in a malicious campaign may have their verdicts or metadata updated as a result of rescanning as described in block 901. If the changes in verdicts or metadata result in a campaign failing to meet metric thresholds defined by the campaign identification rules as described in FIG. 3 (e.g., the percentage of malicious nodes falls below the configured threshold for malicious campaign identification), then the system can reclassify the campaign as inactive. If the campaign threat is determined as inactive, then operational flow continues at block 917, otherwise operations conclude.

At block 917, the malicious campaign detection system disables the campaign and associated entities. The system changes the status of the campaign to inactive in the database of malicious campaigns, such as by changing a flag in the graph data for the campaign that indicates an active/inactive status. The individual releasable node members of the malicious campaign are likewise indicated as inactive members of the campaign. Unlike the operations of block 911, the connections between the releasable entities are preserved so that the campaign can be re-scanned at a later point to determine if the campaign has become active again.

Variations

The foregoing description refers to both "entities" and "network-related entities". Any entities corresponding to nodes in a seed entity graph, prior to or subsequent to pruning, merging, and malicious campaign identification operations, are entities related to a network (e.g., domains, IP addresses, files, etc.) and a such can alternatively be referred to as network-related entities.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example but not limited to, a system, apparatus, or device, which employs one or a combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 10:
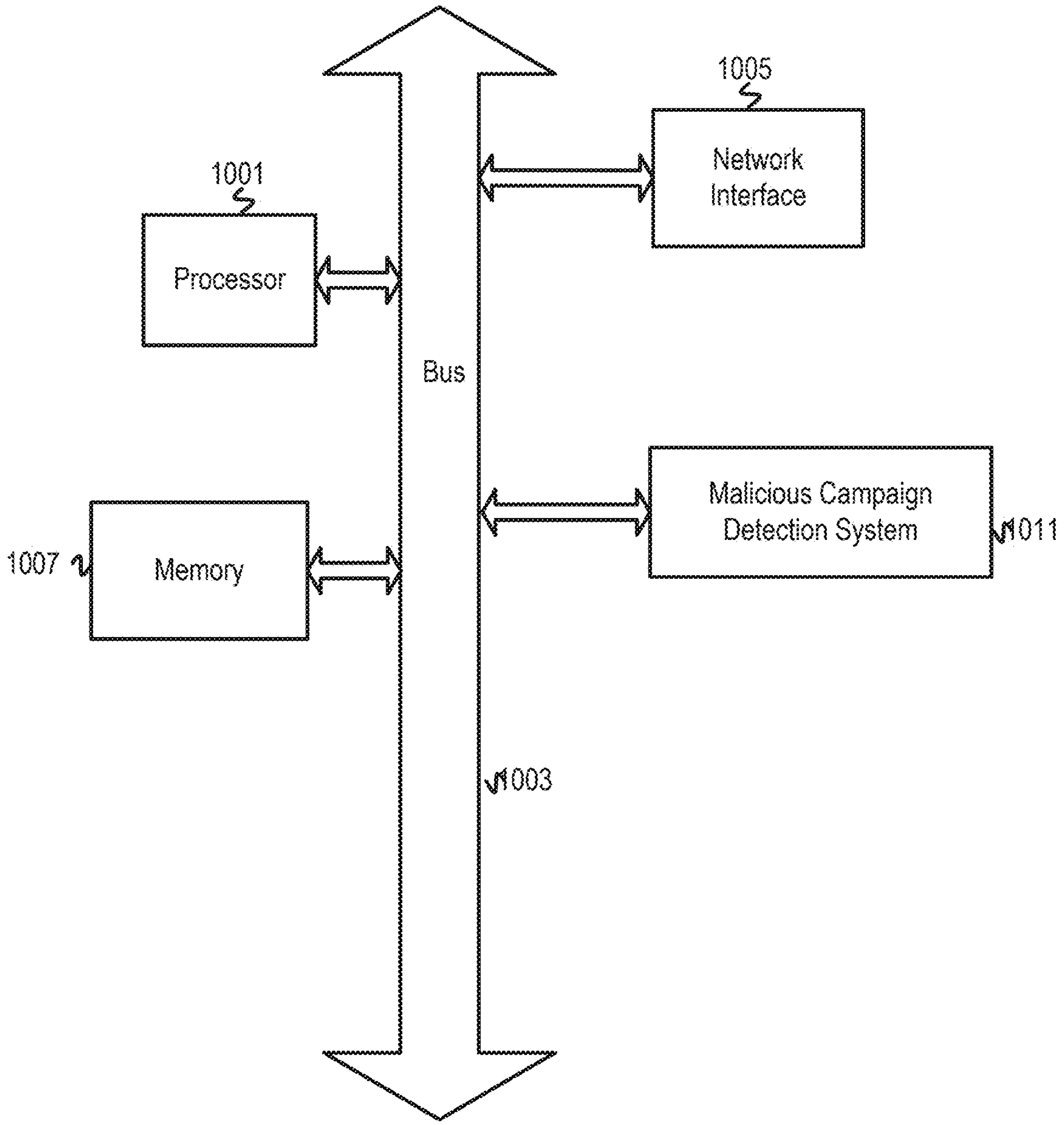
FIG. 10 depicts an example computer system with a malicious campaign detection system.

FIG. 10 depicts an example computer system with a malicious campaign detection system. The computer system includes a processor 1001 (possibly including multiple processors, multiple cores, multiple nodes, and/or implementing multi-threading, etc.). The computer system includes memory 1007. The memory 1007 may be system memory or any one or more of the above already described possible realizations of machine-readable media. The computer system also includes a bus 1003 and a network interface 1005. The system also includes a malicious campaign detection system 1011. The malicious campaign detection system 1011 identifies malicious campaigns based on graph data of an initial set of network-related entities. The malicious campaign detection system 1011, upon obtaining the initial set of network-related entities ("seed entities"), retrieves graph data corresponding to each seed entity. Based on retrieved verdicts for each domain entity, the malicious campaign detection system 1011 prunes the seed entity graphs of nodes that are not useful for malicious campaign identification. The malicious campaign detection system 1011 merges pruned seed entity graphs based on common nodes to obtain merged graphs and evaluates each merged graph based on a set of campaign identification rules. Merged graphs that satisfy criteria for malicious campaign identification are indicated as corresponding to malicious campaigns and a campaign description is generated for the campaign using the metadata for entities determined to be important to the context of the malicious campaign. The malicious campaign detection system 1011 then publishes the campaign description alongside the important ("releasable") nodes and continues to monitor published campaigns for changes to campaign status and/or entity status. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

identifying subsets of a directed graph structure for a plurality of network-related entities, wherein each subset corresponds to one of a plurality of target network-related entities in the plurality of network-related entities, wherein nodes in the directed graph structure comprises indications of the plurality of network-related entities, wherein edges in the directed graph structure indicate relationships between corresponding pairs of network-related entities in the plurality of network-related entities;

merging the subsets of the directed graph structure based on common nodes to obtain one or more merged subsets of the directed graph structure;

evaluating each of the merged subsets against first one or more rules, wherein the first one or more rules comprise rules applied to characteristics of at least one of nodes and edges in the one or more merged subsets and graph topology of the one or more merged subsets;

detecting a first malicious campaign based on a first merged subset of the one or more merged subsets satisfying the first one or more rules; and invoking a language model with a first prompt to obtain a description of the malicious campaign, wherein the first prompt comprises a description of those of the plurality of network-related entities and those of the relationships corresponding to nodes and edges, respectively, in the first merged subset of the directed graph structure and at least one of task instructions to describe the plurality of target network-related entities in the first merged subset, task instructions to describe relationships between important nodes in the first merged subset, task instructions to describe patterns of entity names in the first merged subset, task instructions to describe common edge types in the first merged subset, and task instructions to describe reasons for attackers to leverage nodes in the first merged subset.

2. The method of claim 1 further comprising, prior to merging the subsets of the directed graph structure, for each subset of the subsets of the directed graph structure, pruning low importance nodes from the subset of the directed graph structure.

3. The method of claim 1, wherein the characteristics of at least one of nodes in the one or more merged subsets and graph topology of the one or more merged subsets comprise malicious or benign node verdicts and longest directed path lengths.

4. The method of claim 1, further comprising, prior to invoking the language model with the first prompt, propagating malicious scores of nodes in the first merged subset of the directed graph structure; and removing nodes from the first merged subset of the directed graph structure having low maliciousness scores.

5. The method of claim 1, further comprising identifying network-related entities corresponding to at least one of newly registered domains, newly observed domains, telemetry logs, and reports from third-party services as the plurality of target network-related entities.

6. The method of claim 1, further comprising monitoring the first merged subset of the directed graph structure for additions and removals of nodes corresponding to the malicious campaign.

7. The method of claim 1, wherein each of the plurality of network-related entities comprise at least one of a domain, an Internet Protocol address, a uniform resource locator, and a file, wherein a relationship between a first entity and a second entity in one of the pairs comprise at least one of that a domain name of the first entity resolves to an Internet Protocol address of the second entity, that the first entity is a subdomain of the second entity, that the first entity downloads the second entity, that the first entity redirects to the second entity, that the first entity contains or indicates the second entity, that the first entity contacts the second entity, that the first entity is a path of the second entity, that a destination address for an email communicated from the first entity resolves to the second entity, and that a domain name of the first entity resolves to a domain name of the second entity.

8. The method of claim 1, wherein propagating malicious scores of nodes in the first merged subset of the directed graph structure comprising propagating malicious scores of nodes according to second one or more rules for malicious verdict propagation and third one or more rules for benign verdict propagation.

9. A non-transitory machine-readable medium having program code stored thereon, the program code comprising instructions to:

identify subsets of a directed graph structure for a plurality of network-related entities, wherein each subset corresponds to one of a plurality of target network-related entities in the plurality of network-related entities, wherein nodes in the directed graph structure comprises indications of the plurality of network-related entities, wherein edges in the directed graph structure indicate relationships between corresponding pairs of network-related entities in the plurality of network-related entities;

merge the subsets of the directed graph structure based on common nodes to obtain one or more merged subsets of the directed graph structure;

evaluate each of the merged subsets against one or more rules, wherein the one or more rules comprise rules applied to characteristics of at least one of nodes and edges in the one or more merged subsets and graph topology of the one or more merged subsets;

detect a first malicious campaign based on a first merged subset of the one or more merged subsets satisfying the one or more rules; and invoke a language model with a first prompt to obtain a description of the malicious campaign, wherein the first prompt comprises a description of those of the plurality of network-related entities and those of the relationships corresponding to nodes and edges, respectively, in the first merged subset of the directed graph structure and at least one of task instructions to describe the plurality of target network-related entities in the first merged subset, task instructions to describe relationships between important nodes in the first merged subset, task instructions to describe patterns of entity names in the first merged subset, task instructions to describe common edge types in the first merged subset, and task instructions to describe reasons for attackers to leverage nodes in the first merged subset.

10. The non-transitory machine-readable medium of claim 9, wherein the program code further comprises instructions to, prior to merging the subsets of the directed graph structure, for each subset of the subsets of the directed graph structure, prune low importance nodes from the subset of the directed graph structure.

11. The non-transitory machine-readable medium of claim 9, wherein the characteristics of at least one of nodes in the one or more merged subsets and graph topology of the one or more merged subsets comprise malicious or benign node verdicts and longest directed path lengths.

12. The non-transitory machine-readable medium of claim 9, wherein the program code further comprises instructions to, prior to invoking the language model with the first prompt, propagate malicious scores of nodes in the first merged subset of the directed graph structure; and remove nodes from the first merged subset of the directed graph structure having low maliciousness scores.

13. The non-transitory machine-readable medium of claim 9, wherein the program code further comprises instructions to identify network-related entities corresponding to at least one of newly registered domains, newly observed domains, telemetry logs, and reports from third-party services as the plurality of target network-related entities.

14. The non-transitory machine-readable medium of claim 9, wherein each of the plurality of network-related entities comprises at least one of a domain, an Internet Protocol address, a uniform resource locator, and a file, wherein a relationship between a first entity and a second entity in one of the pairs comprises at least one of that a domain name of the first entity resolves to an Internet Protocol address of the second entity, that the first entity is a subdomain of the second entity, that the first entity downloads the second entity, that the first entity redirects to the second entity, that the first entity contains or indicates the second entity, that the first entity contacts the second entity, that the first entity is a path of the second entity, that a destination address for an email communicated from the first entity resolves to the second entity, and that a domain name of the first entity resolves to a domain name of the second entity.

15. An apparatus comprising:

a processor; and a non-transitory machine-readable medium having instructions stored thereon that are executable by the processor to cause the apparatus to, identify subsets of a directed graph structure for a plurality of network-related entities, wherein each subset corresponds to one of a plurality of target network-related entities in the plurality of network-related entities, wherein nodes in the directed graph structure comprise indications of the plurality of network-related entities, wherein edges in the directed graph structure indicate relationships between corresponding pairs of network related entities in the plurality of network-related entities;

merge the subsets of the directed graph structure based on common nodes to obtain one or more merged subsets of the directed graph structure;

evaluate each of the merged subsets against one or more rules, wherein the one or more rules comprise rules applied to characteristics of at least one of nodes and edges in the one or more merged subsets and graph topology of the one or more merged subsets;

detect a first malicious campaign based on a first merged subset of the one or more merged subsets satisfying the one or more rules; and invoke a language model with a first prompt to obtain a description of the malicious campaign, wherein the first prompt comprises a description of those of the plurality of network-related entities and those of the relationships corresponding to nodes and edges, respectively, in the first merged subset of the directed graph structure and at least one of task instructions to describe the plurality of target network-related entities in the first merged subset, task instructions to describe relationships between important nodes in the first merged subset, task instructions to describe patterns of entity names in the first merged subset, task instructions to describe common edge types in the first merged subset, and task instructions to describe reasons for attackers to leverage nodes in the first merged subset.

16. The apparatus of claim 15, wherein the machine-readable medium further has stored thereon instructions executable by the processor to cause the apparatus to, prior to merging the subsets of the directed graph structure, for each subset of the subsets of the directed graph structure, prune low importance nodes from the subset of the directed graph structure.

17. The apparatus of claim 15, wherein the characteristics of at least one of nodes in the one or more merged subsets and graph topology of the one or more merged subsets comprise malicious or benign node verdicts and longest directed path lengths.

18. The apparatus of claim 15, wherein the machine-readable medium further has stored thereon instructions executable by the processor to cause the apparatus to, prior to invoking the language model with the first prompt, propagate malicious scores of nodes in the first merged subset of the directed graph structure; and remove nodes from the first merged subset of the directed graph structure having low maliciousness scores.

19. The apparatus of claim 15, wherein the machine-readable medium further has stored thereon instructions executable by the processor to cause the apparatus to identify network-related entities corresponding to at least one of newly registered domains, newly observed domains, telemetry logs, and reports from third-party services as the plurality of target network-related entities.

20. The apparatus of claim 15, wherein each of the plurality of network-related entities comprise at least one of a domain, an Internet Protocol address, a uniform resource locator, and a file, wherein a relationship between a first entity and a second entity in one of the pairs comprise at least one of that a domain name of the first entity resolves to an Internet Protocol address of the second entity, that the first entity is a subdomain of the second entity, that the first entity downloads the second entity, that the first entity redirects to the second entity, that the first entity contains or indicates the second entity, that the first entity contacts the second entity, that the first entity is a path of the second entity, that a destination address for an email communicated from the first entity resolves to the second entity, and that a domain name of the first entity resolves to a domain name of the second entity.

* * * * *